(No Model.)
H. SCHULZE-BERGE.
ROAD ENGINE.
No. 317,583. Patented May 12, 1885.
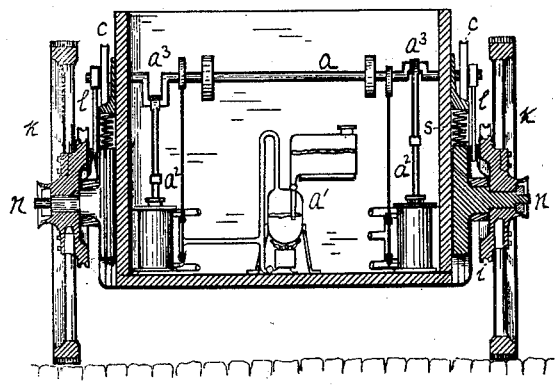
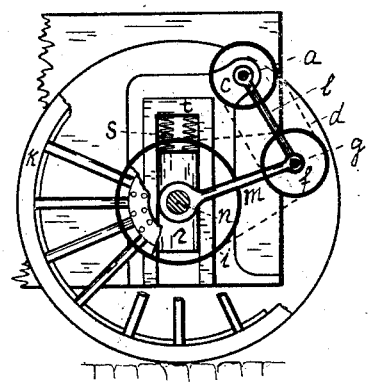
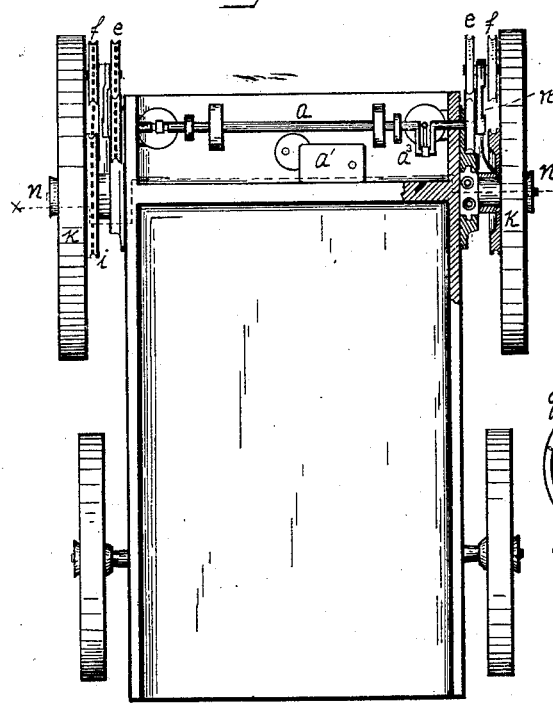
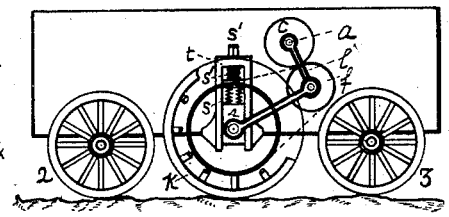
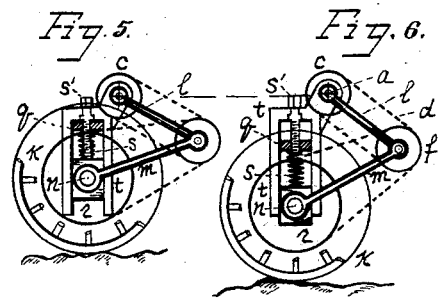
WITNESSES:
J. A. Burns,
J. K. Smith
INVENTOR
Hermann Schulze-Berge
BY
Bakewell & Kerr
ATTORNEYS
N. PETERS, Photo-Lithographer, Washington, D. C.

UNITED STATES PATENT OFFICE.

HERMANN SCHULZE-BERGE, OF ROCHESTER, PENNSYLVANIA.

ROAD-ENGINE.

SPECIFICATION forming part of Letters Patent No. 317,583, dated May 12, 1885.

Application filed October 25, 1884. (No model.)

*To all whom it may concern:*

Be it known that I, HERMANN SCHULZE-BERGE, a resident of Rochester, in the county of Beaver and State of Pennsylvania, have invented a new and useful Improvement in Vehicles; and I do hereby declare the following to be a full, clear, and exact description thereof.

My invention relates to an improvement in vehicles, more particularly to those classes of vehicles in which a motive power is transferred to the wheels from a power-driven shaft within the vehicles, or is communicated to mechanism within or upon the vehicle from revolution of the wheels. To the former class belong road-wagons driven by steam or other motive power, and the latter class embraces many mowing-machines and other agricultural implements, the mechanism of which is moved by power from the wheels as the apparatus moves over the ground.

Heretofore a great difficulty in the construction and operation of such vehicles has been to arrange the power-transmitting gearing so as to compensate for the jolts and jars received as the vehicle passes over uneven ground, for if the parts are rigidly adjusted the unevenness of rough roads or plowed fields may soon break or bend them irreparably.

It is the object of my invention to prevent this by so adjusting the power mechanism as to allow it considerable movement without disturbing its action. I will now describe it with reference to the accompanying drawings, in which—

Figure 1 is a plan view of a road-wagon containing my improvement. Fig. 2 is a vertical cross-section on the line $x x$ of Fig. 1. Fig. 3 is a side elevation of one of the main vehicle-wheels, illustrating its manner of connection with the inner power-shaft, (marked $a$.) Fig. 4 is a similar view showing the wheel in connection with the whole vehicle-body and containing a modification of my improvement. Figs. 5 and 6 are detached views illustrating the operation of said modification.

Like letters of reference indicate like parts wherever they occur.

Suppose, first, that the vehicle drive-wheels are driven by power derived from the revolution of a shaft, $a$, mounted in fixed bearings in the vehicle-body, and that this shaft is driven by an engine, $a'$, whose piston-rods $a^2$ are connected thereto by eccentric crank-arms $a^3$. Keyed to the ends of the shaft $a$ are sprocket-wheels $c$ $c$, one sprocket-wheel being affixed to each end, and pivotally mounted upon the axis of each of the sprocket-wheels is a radial revoluble arm, $l$. Jointed to the free end of this arm is a similar swinging arm, $m$, which is in like manner loosely connected with the axle $n$ of the driving-wheel $k$. In this manner there is a jointed elbow-connection between the main axle and the shaft $a$ on each side of the vehicle, and it is clear that if the main axle be journaled in bearings mounted in a vertical slot in the axle-box the axle may move up or down without varying the distances between the points $n$ and $g$, the middle joint of the elbow, and between $g$ and $a$. During such motion of the main axle there will, however, be a constant swinging of the jointed arms and a movement of the middle point, $g$. To the pin or shaft $g$, which joins the swinging arms $m$ and $l$, there are affixed two sprocket-wheels, $e$ and $f$, one, $e$, of which is connected with the sprocket-wheel $c$ on the shaft $a$ by a link chain, $d$, which passes around the peripheries of both wheels, and the other, $f$, is similarly geared to a sprocket-wheel, $i$, fixed to the end of the axle $n$, or to the wheel $k$, if it be loose upon the axle and the axle be fixed. The axle $n$ of the driving-wheels $k$ is journaled within or fixed to axle blocks or boxes $r$, which are mounted within vertical slots or slotted frames on the sides of the vehicle-body; or they may be otherwise suitably arranged so as to be capable of a vertical movement against springs $s$. In the case I have supposed these springs are adjusted within the slotted frame and between the upper extremity of the slot and the top of the sliding block $r$. Revolution of the shaft $a$ will rotate the sprocket-wheels $e$ and their axes, which will in turn rotate the sprocket-wheels $i$ and the driving-wheels $k$, thus propelling the vehicle. As the axles of the driving-wheels rise and fall with the jolts of the vehicle, the tension of the sprocket-chains will not be affected, for since the distances between the points $n$ and $g$ and $g$ and $a$ always remain constant the distances between the peripheries of the several sprocket-wheels centered on these points will also be unvarying. The result is, that the strain of locomotion is taken entirely off the power-shaft *a* and its seve connections, and that the durability of the apparatus is thereby greatly increased.

Suppose, now, that the shaft *a* is connected with the cutters of a mowing-machine or other apparatus, instead of with the pistons of a steam or vapor engine, the other parts of the vehicle remaining substantially as before described. In such case the wheels *k* in turning will move the sprocket-wheels *i*, which are fixed thereto, and by these wheels power will be transmitted to the shaft *a* through the sprocket-wheels *e*, *f*, and *c*. Then, also, the gearing of the driven machinery will be unaffected by the vertical movements of the driving-wheels as they pass over rough ground.

Instead of using the sprocket-wheels and chains shown in the drawings, belt-wheels, cogs, or crank-shafts may be mounted on the swinging arms *l m*, so as to connect with the intermediate swinging joint at *g*, all of which devices I desire to include and cover by the generic term "gearing" used in the claims. If these gearings are arranged independently of the vehicle-body, the limits of compression of the springs *s* may be made as large as desirable without danger of disconnecting or changing the distance between any of the gearing on the several swinging arms *l* and *m*.

By means of an addition to the devices herein described I am enabled to effect another material improvement in vehicles by regulating the amount of pressure exerted upon the driving-wheels *k* from the weight of the vehicle. When a road locomotive-engine is very heavily loaded, and there is a great pressure upon the driving-wheels, the increase of friction caused thereby upon the periphery of the wheel and upon its axle where it joins with the vehicle-body retards the action of the engine and wastes considerable power. The amount of friction thus caused varies with the weight exerted by the wagon-body upon the driving-wheels, and if this weight can by suitable mechanism be partially raised from these wheels and caused to rest upon the other wheels of the vehicle, it will of course be lessened, and the driving-wheels will propel the vehicle without waste of power. I perform this result in this way by the devices shown in Figs. 4, 5, and 6. Instead of bearing directly upon the upper end of the slotted frame *t*, the axle-springs bear upon blocks *q*, which are mounted within the slot, and are provided with set-screws *s'*, which extend thereto from the top of the frame *t*. By turning these set-screws the blocks *q* may be raised or lowered in their slots, and in lowering them the compression of the interposed springs will also depress the axle-blocks *r*. The effect of this is to raise the vehicle-body somewhat from the forward and rear wheels, 2 and 3, and consequently to cause a greater pressure upon the driving-wheels. If, however, the set-screws *s'* be turned so as to raise the block *q*, it is clear that the vehicle-body will sit more upon the springs of the wheels 2 and 3, and that the axles of the drive-wheels will rise in their bearings, thus causing a greater or less decrease of pressure thereon, according to the distance of movement of the set-screws. (See Fig. 5.)

By these means I have a simple and effective device for regulating the amount of friction which I desire upon the drive-wheels, and by raising the block *q* when the load on the vehicle is increased and lowering it with lessened weights I can keep the friction constant. This modification is applicable to either kind of vehicle hereinbefore described.

When the vehicle is driven by an engine, *a'*, it is of course preferable to employ a motive power the apparatus for which is light and easily portable. Gas-engines, vapor-engines, and electromotors are all well adapted for this purpose. The engine shown in the drawings is intended to be driven by gas generated in the retort *a'*.

Having thus described my improvement, so that others skilled in the art to which it appertains may manufacture and use it, what I claim as my invention, and desire to secure by Letters Patent, is—

1. In a road-vehicle, the combination of a shaft mounted on stationary bearings on the vehicle, one or more of the wheels of the vehicle connected with the body of the vehicle so as to be capable of a vertical movement toward or away from the body of the vehicle as the wheel passes over uneven ground, jointed arms connected with the shaft and with the axle of the said vehicle wheel or wheels, and a gearing mounted on the middle joint of said arms, and capable of receiving and transmitting power from the shaft to the wheel or wheels, substantially as and for the purpose specified.

2. The combination, in a vehicle having an intermediate axle mounted on swinging bearings for transmitting motion, substantially as described, between a vehicle-wheel and a shaft mounted on stationary bearings within the vehicle, of a drive-wheel whose axis is vertically movable against suitable springs connected with the vehicle-body and adapted to compensate for unevenness of the ground over which it moves, and a vertically-adjustable block for raising and depressing said springs and said axle toward and away from the vehicle-body, as and for the purposes specified.

In testimony whereof I have hereunto set my hand this 18th day of October, A. D. 1884.

HERMANN SCHULZE-BERGE.

Witnesses:
THOMAS W. BAKEWELL,
JOS. H. JACOBS.